(12) United States Patent
Stafford

(10) Patent No.: US 8,793,620 B2
(45) Date of Patent: Jul. 29, 2014

(54) GAZE-ASSISTED COMPUTER INTERFACE

(75) Inventor: Jeffrey Roger Stafford, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 141 days.

(21) Appl. No.: 13/092,115

(22) Filed: Apr. 21, 2011

(65) Prior Publication Data

US 2012/0272179 A1    Oct. 25, 2012

(51) Int. Cl.
*G06F 3/048* (2013.01)
*G06F 3/033* (2013.01)
*G06F 3/01* (2006.01)
*G06F 3/0485* (2013.01)

(52) U.S. Cl.
CPC ............ *G06F 3/013* (2013.01); *G06F 3/012* (2013.01); *G06F 3/0485* (2013.01)
USPC ............................ 715/862; 345/159; 715/858

(58) Field of Classification Search
CPC ........................................................ G06F 3/048
USPC .................................................. 715/700, 781
See application file for complete search history.

(56) References Cited

U.S. PATENT DOCUMENTS

| | | | |
|---|---|---|---|
| 6,152,563 A * | 11/2000 | Hutchinson et al. .......... | 351/209 |
| 6,204,828 B1 * | 3/2001 | Amir et al. ........................ | 345/7 |
| 6,281,877 B1 * | 8/2001 | Fisher et al. .................... | 715/860 |
| 6,282,553 B1 | 8/2001 | Flickner et al. | |
| 6,859,144 B2 | 2/2005 | Newman et al. ............... | 340/576 |
| 7,627,139 B2 * | 12/2009 | Marks et al. ................... | 382/103 |
| 2006/0112334 A1 | 5/2006 | Endrikhovski et al. ....... | 715/700 |
| 2006/0192775 A1 * | 8/2006 | Nicholson et al. ............ | 345/211 |
| 2006/0253799 A1 * | 11/2006 | Montroy et al. .............. | 715/809 |
| 2006/0256083 A1 * | 11/2006 | Rosenberg .................... | 345/156 |

(Continued)

FOREIGN PATENT DOCUMENTS

| | | |
|---|---|---|
| DE | 102005003535 A1 | 8/2006 |
| DE | 102009034069 A1 | 5/2010 |

(Continued)

OTHER PUBLICATIONS

Alice Oh, et al., "Evaluating Look-to-Talk: A Gaze-Aware Interface in a Collaborative Environment", CHI '02 Extended Abstracts on Human Factors in Computing System, CHI 2002, Jan. 1, 2002, p. 650.

(Continued)

*Primary Examiner* — Alvin Tan
*Assistant Examiner* — Xuyang Xia
(74) *Attorney, Agent, or Firm* — Martine Penilla Group, LLP

(57) ABSTRACT

Methods, systems, and computer programs for interfacing a user with a Graphical User Interface (GUI) are provided. One method includes an operation for identifying the point of gaze (POG) of the user. The initiation of a physical action by the user, to move a position of a cursor on a display, is detected, where the cursor defines a focus area associated with a computer program executing the GUI. Further, the method includes an operation for determining if the distance between the current position of the cursor and the POG is greater than a threshold distance. The cursor is moved from the current position to a region proximate to the POG in response to the determination of the POG and to the detection of the initiation of the physical action.

20 Claims, 8 Drawing Sheets

(56) References Cited

U.S. PATENT DOCUMENTS

| | | | |
|---|---|---|---|
| 2006/0290663 A1* | 12/2006 | Mitchell | 345/156 |
| 2008/0111833 A1 | 5/2008 | Thorn et al. | 345/690 |
| 2008/0211766 A1* | 9/2008 | Westerman et al. | 345/156 |
| 2009/0146953 A1* | 6/2009 | Lou et al. | 345/163 |
| 2009/0315869 A1 | 12/2009 | Sugihara et al. | |
| 2010/0121501 A1 | 5/2010 | Neugebauer et al. | |
| 2010/0156781 A1 | 6/2010 | Fahn | |
| 2011/0022950 A1* | 1/2011 | Dallago | 715/256 |
| 2011/0175932 A1* | 7/2011 | Yu et al. | 345/661 |
| 2011/0320978 A1* | 12/2011 | Horodezky et al. | 715/823 |
| 2012/0029302 A1* | 2/2012 | Hsu et al. | 600/300 |
| 2012/0188148 A1* | 7/2012 | Dejong | 345/8 |

FOREIGN PATENT DOCUMENTS

| | | |
|---|---|---|
| EP | 0 718 823 A2 | 6/1996 |
| EP | 0718823 A2 | 6/1996 |
| GB | 2440348 A * | 1/2008 |

OTHER PUBLICATIONS

Renaud Blanch et al., "Semantic Pointing: Improving Target Acquisition With Control-Display Ratio Adaption", CHI 2004: [CHI Conference Proceedings. Human Factors in Computing Systems], Vienna, Austria, Apr. 29, 2004, pp. 519-526.

Adam Frucci, "Modded Nintendo Lets You Play Mario with Your Eyes Poorly", Aug. 3, 2010, Gizmodo, http://gizmodo.com/5603753/modded-nintendo-lets-you-play-mario- . . . .

Renaud Blanch et al; "Semantic Pointing: Improving Target Acquisition with Control Display Ratio Adaptation", CHI 2004; [CHI Conference Proceedings. Human Factors in Computing Systems], Vienna, Austria, Apr. 29, 2004, pp. 519-526, XP002464851, ISBN: 978-1-58113-702-6.

PCT International Search Report and Written Opinion of the ISA/EP issued in the International Application No. PCT/US2012/032613, European Property Office, Oct. 31, 2013.

* cited by examiner

GAZE-ASSISTED COMPUTER INTERFACE

CROSS REFERENCE TO RELATED APPLICATIONS

This application is related to U.S. patent application Ser. No. 12/947,290, filed Nov. 16, 2010, and entitled "Maintaining Multiple Views on a Shared Stable Virtual Space"; U.S. patent application Ser. No. 13/045,414, filed Mar. 10, 2011, and entitled "Selecting View Orientation in Portable Device via Image Analysis"; U.S. patent application Ser. No. 11/368,766, filed Mar. 6, 2006, and entitled "System and Method for Detecting User Attention"; U.S. patent application Ser. No. 13/115,927, filed May 25, 2011, and entitled "Eye Gaze to Alter Device Behavior"; and U.S. patent application Ser. No. 13/110,817, filed May 18, 2011, and entitled "Interface with Gaze Detection and Voice Input", all of which are incorporated herein by reference.

BACKGROUND

1. Field of the Invention

The present invention relates to Graphical User Interfaces (GUIs), and more particularly, to methods, systems, and computer programs for interfacing with a GUI that provides gaze-assisted navigation.

2. Description of the Related Art

In current computer interfaces, a mouse-controlled screen cursor travels over the virtual real estate of a display-rendered desktop, at speeds determined by hand speed and mouse sensitivity. Over the years, the size of the virtual desktop real estate has increased due to the appearance of larger screen sizes, increased screen resolutions, multiple screens, etc. However, the gearing of the human input device, the mouse, which controls the cursor, has not changed. For instance, moving a mouse on a desktop of 640×480 requires only a few inches, at most, of hand movement, usually involving only wrist motions. However, with a desktop resolution of 2560× 1600, or greater when using multiple screens, a user cannot use solely the wrist to move the mouse cursor from one side of the desktop to the opposite side, or from one display to another. In this scenario, a "mouse hand shuffle" is sometimes required, where a user moves the mouse as far as the mouse can go before falling off the mouse pad, then lifts the mouse up, moves the mouse back, drops the mouse down again, and moves the mouse on the pad again. This is a cumbersome operation that makes interfacing with large displays tiring.

It is in this context that embodiments arise.

SUMMARY

Embodiments of the present invention provide Methods, systems, and computer programs for interfacing a user with a Graphical User Interface (GUI). It should be appreciated that the present invention can be implemented in numerous ways, such as a process, an apparatus, a system, a device or a method on a computer readable medium. Several inventive embodiments of the present invention are described below.

In one embodiment, a method includes an operation for identifying the point of gaze (POG) of the user. The initiation of a physical action by the user, to move a position of a cursor on a display, is detected, where the cursor defines a focus area associated with a computer program executing the GUI. Further, the method includes an operation for determining if the distance between the current position of the cursor and the POG is greater than a threshold distance. The cursor is moved from the current position to a region proximate to the POG in response to the determination of the POG and to the detection of the initiation of the physical action.

In another embodiment, a system with a GUI includes a processor, an input device, and a gaze detection module. The processor executes a computer program that provides the GUI, the GUI being rendered in one or more displays. The input device is operable to move a position of a cursor on the one or more displays when a physical action is initiated by the user on the input device. Additionally, the gaze detection module is operable to identify a POG of the user, and the computer program determines if the distance between the current position of the cursor and the POG is greater than a threshold distance. The computer program moves the cursor from the current position to a region proximate to the POG in response to the determination of the distance and the detection of the physical action.

In yet another embodiment, a non-transitory computer readable medium having program instructions that when executed by a computer implement a method for interfacing a user with a computer program. The method includes an operation for identifying the point of gaze (POG) of the user. The initiation of a physical action by the user, to move a position of a cursor on a display, is detected, where the cursor defines a focus area associated with a computer program executing the GUI. Further, the method includes an operation for determining if the distance between the current position of the cursor and the POG is greater than a threshold distance. The cursor is moved from the current position to a region proximate to the POG in response to the determination of the POG and to the detection of the initiation of the physical action.

Other aspects will become apparent from the following detailed description, taken in conjunction with the accompanying drawings.

BRIEF DESCRIPTION OF THE DRAWINGS

The invention may best be understood by reference to the following description taken in conjunction with the accompanying drawings.

DETAILED DESCRIPTION

Embodiments of the invention utilize gaze tracking to assist in the movement of a cursor in a display, and to reach a target cursor location with less effort. In one embodiment, gaze detection is combined with user intent, manifested as a physical action, to enhance the interface between the user and the computing device.

It will be apparent, that the present embodiments may be practiced without some or all of these specific details. In other instances, well known process operations have not been described in detail in order not to unnecessarily obscure the present embodiments.

Figure 1:
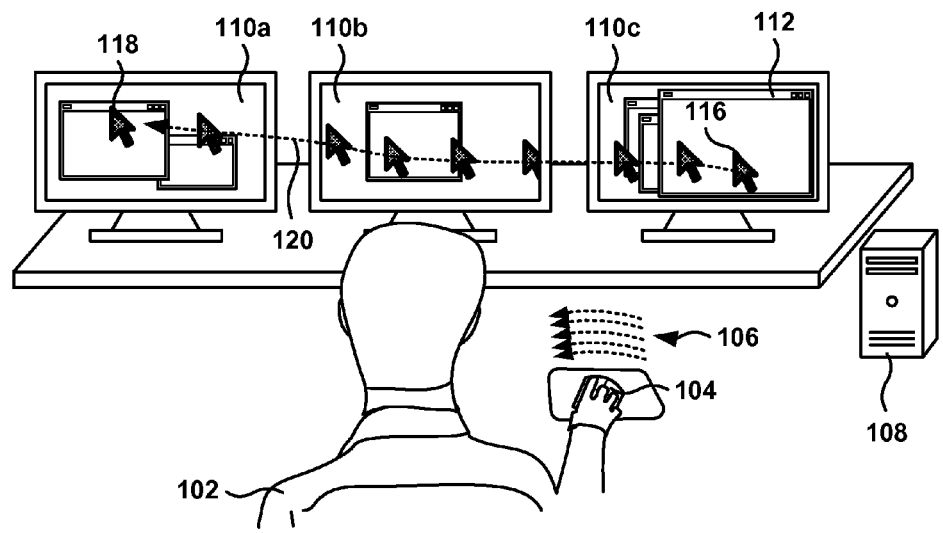
FIG. 1 illustrates the effort required by a user to move a cursor over a long distance, according to one embodiment.

FIG. 1 illustrates the effort required by a user to move a cursor over a long distance, according to one embodiment. Three displays 110a, 110b, and 110c, are connected to computer 108. A windows environment is shown in the three displays, such that the desktop of the windows environment encompasses the three displays, each display presenting a section of the desktop. The three sections are logically interconnected to simulate that the areas form a continuous desktop. In other words, the three displays operate as if there were a single display, but the rendering on the single display is broken into three parts, each part being shown in one of the displays 110a, 110b, and 110c.

When user 102 moves the mouse, the mouse can travel across the three displays, but only be present in one. For example, when a mouse in display 110a is moved to the right of display 110a, the mouse appears on the left of display 110b, because the three displays represent a single desktop.

Three displays provide a large desktop for the user, a useful feature for users that wish to have several windows showing at the same time. However, moving a mouse in the large desktop can be very tedious, especially if the sensitivity of the mouse is high (i.e., a mouse with high sensitivity requires more mouse motion than a mouse with low sensitivity, for the same amount of cursor displacement on the desktop). Therefore, high mouse sensitivity is good for activities that require accurate mouse motion and object selection (e.g., graphics creation and editing), but high mouse sensitivity is disadvantageous for moving the mouse quickly across the desktop. For example, if user 102 wants to move the mouse cursor from position 116 in window 112 to position 118 on display 110a, the mouse 104 has to be moved a large distance from right to left. Since the range of mouse motion is often limited, a large displacement of the mouse cursor often requires that the user move the mouse to the left, lift the mouse, place the mouse on the right, and then move the mouse to the left again, repeating this operation 106 several times to move the cursor to position 118. During the transfer, the mouse cursor moves across trajectory 120, that includes several stops, due to the "mouse hand shuffle."

A "cursor" as used herein refers to a pointer or indicator associated with a computer program that denotes a form of focus for the computer program. The cursor may refer to a mouse cursor that indicates the current position of the pointer controlled by the mouse and which is shown on a display; or to a text cursor (e.g., a vertical line) that indicates where text is entered in a text field (e.g., a word processor, a field in a web page); or to a page cursor that indicates a reference point for operations (e.g., page up, page down, scroll up, etc.) performed on the page (e.g., a web page); etc. The cursor may be represented on screen in different forms, such as an arrow, a hand, a finger, a vertical bar, a scroll bar, etc., or may be hidden at times making the cursor implicit but still available to perform some interface operations, such as "page down." The cursor may be referred to herein as a "focus area," a "mouse cursor," a "page cursor," a "windows cursor," a "text insertion point," etc. Embodiments are presented using a particular form of cursor, but any type of cursor can be utilized, and the embodiments presented should therefore not be interpreted to be exclusive or limiting, but rather exemplary or illustrative.

Typically, user 102 is looking at the desired destination for the cursor, and not at the present location of the mouse cursor. Embodiments of the invention utilize gaze detection to enhance the way users interface with a computer system. For example, gaze detection is used to determine where the user wants to move the cursor, and then to move the cursor to the desired location faster and with less effort. Sometimes, a user may not even know where the mouse is on the display, and the user has to spend time searching for the cursor before the user can even start moving the mouse cursor. However, by using gaze detection, locating the mouse is not required, because what is needed is the knowledge of where the cursor needs to go, not where the cursor happens to be.

It is noted that although gaze alone can be used in some embodiments to interface with the computer system, other embodiments require an associated physical motion by the user. The POG of a user may be erratic, so using POG alone may cause problems, require user confirmation, or require operations that take longer to complete (e.g., requiring that gaze is set in one point for 2 seconds). By combining gaze and other actions (such as moving the cursor with the mouse once the cursor is in the general area of the POG), an easy-to-use interface is provided.

Figure 2A:
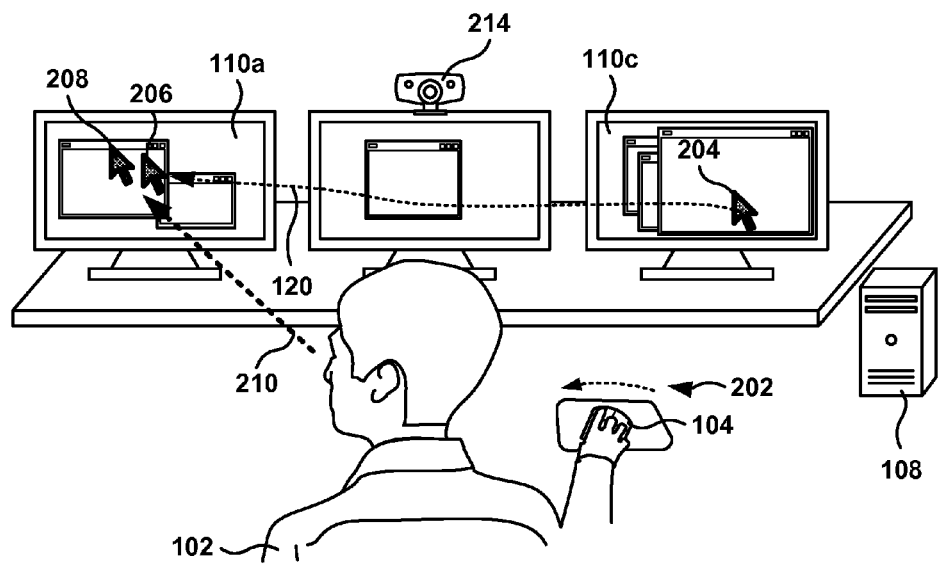
FIGS. 2A-2B show embodiments of gaze-assisted computer systems that reduce the effort to move a cursor over a long distance.
Figure 2B:
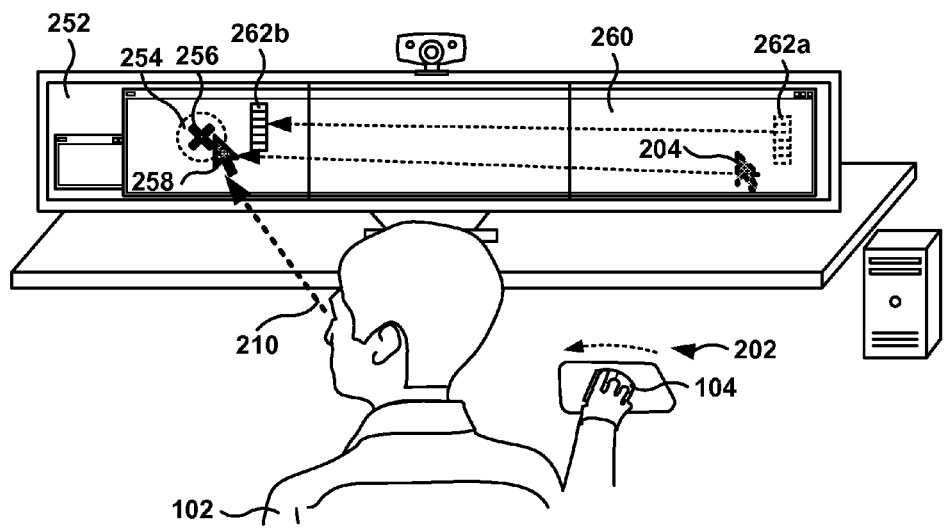

FIGS. 2A-2B show embodiments of gaze-assisted computer systems that reduce the effort to move a cursor over a long distance. In one embodiment, the control of a cursor is aided by the gaze of a user. For the purposes of simplicity, embodiments of the invention area described utilizing the operation of a mouse cursor on a typical Graphical User Interface (GUI) for a display-rendered desktop. Other embodiments may utilize different forms of cursor or avatar control, different input mechanisms (e.g., keyboard, keypad, touchscreen, pedal, etc.), or refer to different display mechanisms (e.g., large display, multiple displays, a display divided in sections, etc.). The embodiments illustrated should therefore not be interpreted to be exclusive or limiting, but rather exemplary or illustrative.

Eye tracking, or eye-gaze tracking, is the process of measuring either the Point-of-gaze (POG) (i.e., where the user is looking), or the motion of an eye relative to the head. POG is the point in space where a person's gaze is directed to, and has also been defined as the point in space that is imaged on the center of the highest acuity region of the retina (fovea) of each eye. More details on gaze detection are provided below with reference to FIGS. 3 and 4.

In reference to FIG. 2A, user 102 whishes to move the mouse cursor from position 204 in display 110c to position 208 in display 110a. A gaze detection system executing on computer 108 determines the POG of the user within the displays that comprise the desktop of the GUI. The user fixes the gaze 210 on the desired destination of the mouse cursor (i.e., looks in the direction of the target for the cursor), and the gaze detection system determines an approximate location 206. While the gaze 210 of user 102 is on the target, user 102 moves 202 mouse 104 with the intent to move the cursor to the target. As computer system 108 detects the beginning of the mouse movement, gaze detection is used to move the cursor near the destination (i.e., the mouse cursor "jumps" to a place near the destination or to the destination). It is noted, that when the cursor is moved utilizing gaze assistance, the cursor is moved from a first location to a second location, without the user having to drag the mouse to perform the gaze-assisted motion. Gaze detection is based on image analysis of images taken by camera 214, but other types of gaze detection are also possible.

The system moves the mouse cursor to position 206, which is the POG calculated by the gaze detection system, and then the system relies solely on the mouse movement to find the final destination for the cursor. The user does not even have to know where the mouse is currently, because the destination is what is required to complete the mouse cursor move. This way, the user does not need to be searching for the mouse cursor to find out where the cursor is currently in the desktop.

In one embodiment, the speed of the cursor movement is variable, such that the cursor movement slows down as the cursor gets closer to the POG. This way, when the cursor is far away from the POG, the cursor moves fast, but when the cursor starts approaching the destination, the cursor slows down and increases the mouse sensitivity to allow the user a finer control of the mouse cursor near the destination. Fine sensitivity is not required while the cursor is far away from the target, because what the user wants is to get to the target fast, and the trajectory that the mouse follows to get to the destination is not important.

By using gaze detection, the system is able to provide a greater level of mouse sensitivity when needed, i.e., when the user is operating in the area of interest. Other acceleration schemes are based on how fast the user is moving the mouse, but these schemes often provide unexpected results, and are hard to adjust properly to provide a balance between sensitivity and ability to move the cursor fast over large distances. In another embodiment, the mouse cursor provides a magnet effect, such that the mouse cursor is attracted to the POG on the display.

In one embodiment, mouse motion is assisted by gaze detection and the context of display objects in the POG area. This way, if the POG is set in an area that contains one or more screen objects from a plurality of screen objects, the cursor position is changed to the screen object from the plurality that is closest to the estimated POG. For example, if the target area of a user's gaze appears to be near the quick launch icons at the bottom left of the Windows desktop, the cursor's position is changed to the quick launch icon closest to the POG.

In yet another embodiment, gaze detection is used to assist in the navigation between fields in one window. If the user is using keyboard navigation, the page cursor moves based on a combination of keyboard input and POG, such that the POG is used to accelerate navigation that would otherwise take more keystrokes without gaze assistance. Page cursor is referred to herein as the pointer in the page that indicates the focus of the page, such as the insertion point when typing in a word processor, or the active field within a form that contains a plurality of possible input fields. Thus page cursor is different from mouse cursor, because the mouse cursor is the pointer associated with the mouse that moves based on the mouse movements. For example, in a page with a plurality of entry fields, and with the page cursor situated at the top field on the page, the user wishes to move to the field at the bottom of the page. Without gaze detection, the typical sequence would be for the user to press the Tab key, or the down-arrow key, multiple times to travel from the top field to the bottom field, passing through all the intermediate fields (or to use the mouse, of course). However, with gaze detection, the user looks at the bottom field, and then the user presses the Tab key (or some other key), then the page cursor jumps immediately to the bottom field, saving the user keystrokes and without having to use the mouse.

Some windows-based GUIs have the concept of window focus. At one point in time, only one window is selected for interaction with the user, i.e., the selected window is "in-focus", unless the desktop is selected and no window is in-focus. In yet another embodiment, gaze detection is used to change the window in focus in the desktop. When the user looks at a window in the desktop and starts moving the mouse, the window that the user is looking at becomes the window with the focus of the GUI. The cursor is also positioned in some location of the window, such as the center of the window, the top, the bottom, the POG on the window, etc.

Due to the sometimes erratic movement of the eyes, it would be difficult to control a mouse cursor just with gaze, as the mouse cursor would sometimes behave erratically and would be difficult for the user to follow. In addition, sometimes the user may want to just read something, and having the cursor move following the POG would be distracting and annoying. This is why some embodiments require the show of intent by the user to move the cursor, and this intent is manifested by a physical action, other than changing gaze, such as moving a mouse or pressing a key.

In one embodiment, threshold timers are defined requiring a minimum amount of time for the gaze to be on one target before gaze detection is activated. The timers enable the filtering of potential erratic changes in gaze. For example, the user must look for at least one second to a window of the screen before gaze detection is engaged when the user starts moving the mouse.

FIG. 2B shows an environment for interfacing a user with a computer system, according to one embodiment. A large display 252 is divided into three contiguous panels. Window 260 is associated with a computer application and expands across the three different panels. The computer application includes a screen object (e.g., toolbox 262a) that can be located in different areas of window 260. In one embodiment, the screen object 262a is located in the panel of the display where the mouse cursor is located, or, in the case of multiple displays, in the display where the mouse cursor is located.

Initially, the mouse cursor (in position 204) and toolbox 262a are on the left panel of display 252. User 102 sets gaze 210 on POG 256 and starts moving 202 mouse 104. As previously described, when the systems detects the intent of the user, manifested by the physical action of moving the mouse, the mouse cursor jumps to position 258, which is on the POG 256 or proximate to the POG 256. Since the mouse cursor has jumped to the left panel, the screen object associated with the current location of the mouse cursor is also moved to position 262b on the left panel. Thus, the user benefits from gaze-assisted cursor motion as well as screen object gaze-assisted motion.

In one embodiment, the system determines if the POG 256 is within a threshold distance from the current location of the mouse cursor before using gaze-assisted cursor navigation. In one embodiment, the threshold distance (e.g., 100 screen pixels) defines a circle 254 around the POG 256. Other types of areas around the POG are also possible to determine when to use gaze assistance, such as a square, a rectangle, an ellipse, an octagon, any regular polygon, etc. If the distance between the current position of the cursor and the POG is greater than the threshold distance, (or if the current position is outside the defined area around the POG) then mouse cursor motion is gaze-assisted. However, if the distance is less than the threshold distance (or the current mouse cursor is inside the area), then gaze-assistance is not used because the user can easily move the mouse to the nearby destination. This way, gaze assistance is only used for larger cursor movements, avoiding confusion when the user is performing small cursor movements.

In yet another embodiment, the trigger to determine if gaze-assistance is used is whether the POG is in the same window as the current mouse cursor. In this case, the scenario depicted in FIG. 2B would not cause gaze-assistance to be triggered because the mouse is moving within the same window.

In the embodiment of FIG. 2B, the start of mouse motion is the physical user action that triggers gaze-assistance. Other embodiments may utilize other type of physical user actions as triggers, such as pressing a keyboard, pushing a button, touching a screen, speaking, snapping the fingers, clapping, etc.

In one embodiment, users move the mouse without the intent to move the mouse cursor on the screen. For example, a user may be reading a web page while holding the mouse, and the user may move the mouse several millimeters due to a small hand motion. To filter random small mouse motions, a threshold of motion for the mouse is set before gaze-assistance is triggered, in one embodiment. Thus, gaze assistance only begins when the mouse is moved at least a threshold mouse distance. In one embodiment, the threshold distance is between about 0.5-5 centimeters of mouse motion, and in another embodiment between 0.5-4 centimeters, and in another embodiment greater than 1 centimeter, but other threshold values are also possible based on the interfacing environment. In another embodiment, the threshold distance may be measured in reference to the motion of the mouse cursor on the screen. For example, the threshold may be set as the mouse cursor moving at least 2, 5, 10, 20, 25, or more than 20 pixels on the screen, although other values are also possible.

Additionally, moving the mouse cursor from the initial position 204, to the position near the POG 258, can be performed in a plurality of ways. For example, the cursor can disappear from the original position and reappear at the destination position (i.e., the cursor jumps), or the cursor can move quickly through the desktop between the original position and the destination, or the cursor may flash briefly at the original position and then reappear and flash at the destination position, or may move across the desktop quickly and slow down as the cursor approaches the destination, or the cursor may appear briefly in several spots on the desktop in the trajectory between original location and destination (i.e., leaving a mouse trail), etc. Thus, there are many ways to indicate to the user that the mouse cursor is moving using gaze-assistance.

Figure 3:
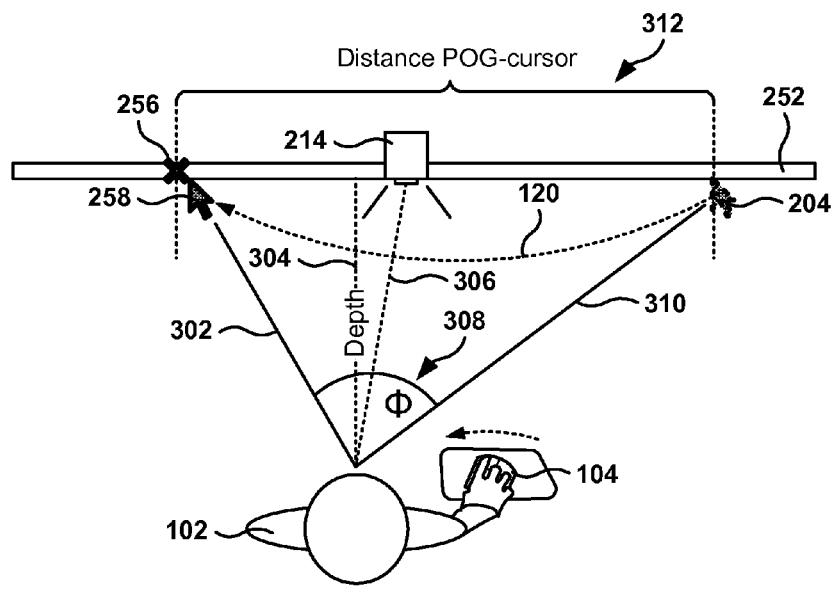
FIG. 3 illustrates the estimation of the distance between the Point of Gaze (POG) and the current position of the cursor, according to one embodiment.

FIG. 3 illustrates the estimation of the distance between the POG and the current position of the cursor, according to one embodiment. Different methods use different distance metrics to measure the distance between the POG and the current cursor, the distance being used to determine if gaze-assisted cursor movement is utilized.

In one embodiment, camera 214 facing 306 user 102 is used to determine the POG. In one embodiment, the distance is measured in pixels. Typically, displays have a horizontal and a vertical resolution for pixels. Once the location of the POG is estimated on the desktop, the distance 312 is calculated as the size in pixels of the diagonal of the rectangle that includes the POG and the current cursor in opposite vertices. If the POG and the cursor are aligned horizontally or vertically, then the distance would be equal to the number of horizontal or vertical pixels, respectively, between the two points.

In another embodiment, the distance is measured as the actual physical distance between the POG and the cursor. The POG defines a first point on the display, and the cursor defines a second point on the display. The distance is calculated as the distance (e.g., measured in inches) between the first point and the second point.

In yet another embodiment, the distance is measured as an angle Φ 308 with vertex at the user 102 (e.g., between the eyes, at the tip of the nose, etc.), with a first ray 302 going from the vertex to the POG 256, and a second ray 310 going from the vertex to the current location 204 of the cursor. Thus, the wider the angle Φ 308 is, the more the mouse will have to travel to reach the POG. The threshold for gaze activation is defined in degrees (e.g., use gaze-assisted motion when the angle Φ 308 is greater than 30°, but other values are also possible). In another embodiment, gaze-assistance is triggered based on the angle Φ 308 and the depth 304 of the user, where the depth is the distance from the user to some location in a display. For example, the threshold measured in degrees may be smaller when a user is further away from the display, because a user situated further from the display will define a smaller angle to travel the same distance than in the case where the user is closer to the display.

Figure 4A:
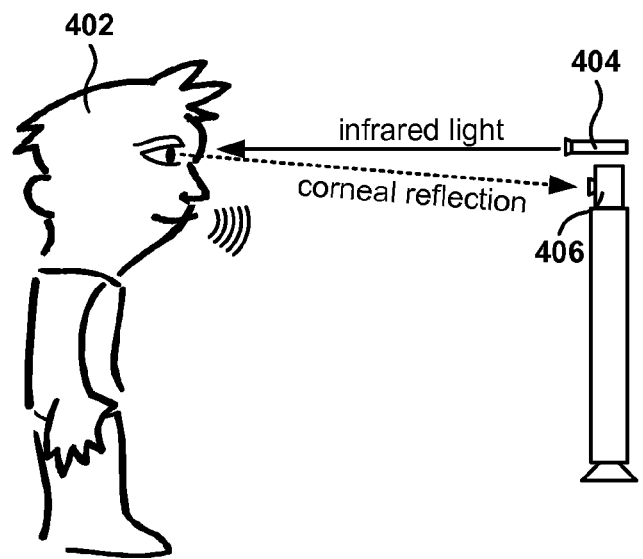
FIG. 4A illustrates an embodiment for POG detection using corneal reflections.

FIG. 4A illustrates an embodiment for POG detection using corneal reflections. An eye tracker is a device for measuring eye position and eye movement. There are a number of methods for measuring eye movement and gaze direction. Some methods use video images from which the eye position is extracted, and other methods use search coils, are based on the electrooculogram, or use infrared light for gaze detection. By utilizing gaze detection, devices can provide more intuitive interaction and improved experiences for the user.

FIG. 4A illustrates one embodiment for gaze detection, where the corneal reflection of light directed towards the user is analyzed. As shown in FIG. 4A, infrared light source 404 emits infrared light, and the reflection of the infrared light, from the cornea of user 402, is captured by infrared camera 406. The reflection is then analyzed to determine the POG of user 402. Infrared light source 404 may also be embedded within camera 406. In another embodiment, light in the visible spectrum is used instead of infrared light, and a combination of visible light and infrared light is also possible.

The perspective projection of the iris-sclera boundary (limbus) is used to estimate the position and orientation of the eye in space, in order to calculate the POG. The POG estimation determines the position of the centers of the pupil and one or more corneal reflections. The corneal reflections are virtual images of light sources (e.g., infrared) that illuminate the eye and are created by the front surface of the cornea, which acts as a convex mirror. More details about gaze detection using corneal reflections can be found in "General theory of remote gaze estimation using the pupil center and corneal reflections," IEEE Transactions on Biomedical Engineering, 2006, by E. Guestrin and M. Eizenman, which is incorporated herein by reference.

Figure 4B:
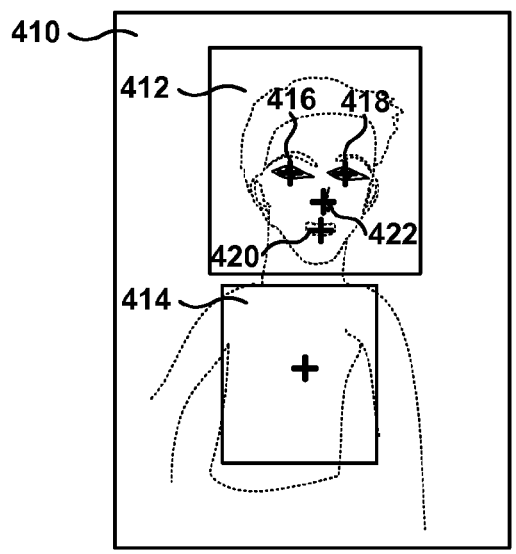
FIG. 4B illustrates a method for POG detection using image analysis and face tracking, according to one embodiment.

FIG. 4B illustrates a method for POG detection using image analysis and face tracking, according to one embodiment. In one embodiment, gaze detection is determined utilizing image analysis of video images 412 of user area 410, including the detection and tracking of user features such as eyes 416 and 418, face, nose 422, mouth 420, torso 414, etc. In the embodiment of FIG. 4B, facial features are tracked to estimate the three dimensional location of the head and to derive the positions of the center of rotation of the eyes. The more features tracked, the more reliable gaze detection will be. For example, if a user turns their head away from the camera, only one eye will be visible to the camera. By understanding the position of the nose and mouth, the system determines that the user has turned the head, instead of assuming a failure in detecting the eye. Once the positions of the user features are determined, the POG is calculated. Head and face tracking can be used to improve the accuracy of gaze detection. In general, head tracking is more accurate than gaze tracking because the head does not move erratically at times, like eyes do.

From the user's gaze direction and the position of the camera in relation to the display, it is possible to determine where on the display a user's gaze is focused. Since the camera and the display may be situated apart from each other, a calibration operation may be performed to determine the location of the display. The user is asked to look at the display, and the system estimates the location of the display or displays. In another embodiment, the calibration operation may include having the user look at one or more targets in the display, or in the displays, to further improve the estimation of the display location and the location of GUI objects within the display.

When using gaze detection based on image analysis, a collection of gaze positions on the desktop are gathered, in one embodiment. Due to the erratic nature of the human visual system, these positions may appear to be a random series of points within a certain area. A central focus position may be derived from the collection of points by using algorithms that determine the POG utilizing statistical analysis. The focus positions obtained in a plurality of images over a period of time are averaged out to filter erratic gaze movements.

The focus position defines the center of a "target area." The size of the target area may also be determined from the stream of gaze positions and from previous focus positions. One algorithm includes finding the distance from each gaze position to the target area center (focus position) and using either the average or the sum of those distances, to estimate a centeroid, which defines the center of the target area.

Using the target area of the gaze focus, an application changes the way the cursor moves in order to reach the target more effectively. This includes changing the speed of mouse cursor movement based on distance from the target area, attracting the cursor to the target focus area, or jumping the position of the cursor to the target area, as previously described.

In one embodiment, tracking is divided in phases, with a first phase defined by head tracking, and a second phase defined by gaze detection. When the head is moving, head tracking is used to determine the target area, because head tracking is generally more reliable than gaze tracking. Once head motion substantially comes to a stop, gaze tracking is utilized to fine tune the location of the target area, followed by mouse motion to get an even finer resolution to move the cursor to its destination. In another embodiment, the phases of tracking include, at least, a first phase where head tracking is used to select a display from a plurality of displays, and a second phase where gaze tracking is used to define a target within the selected display.

Figure 5:
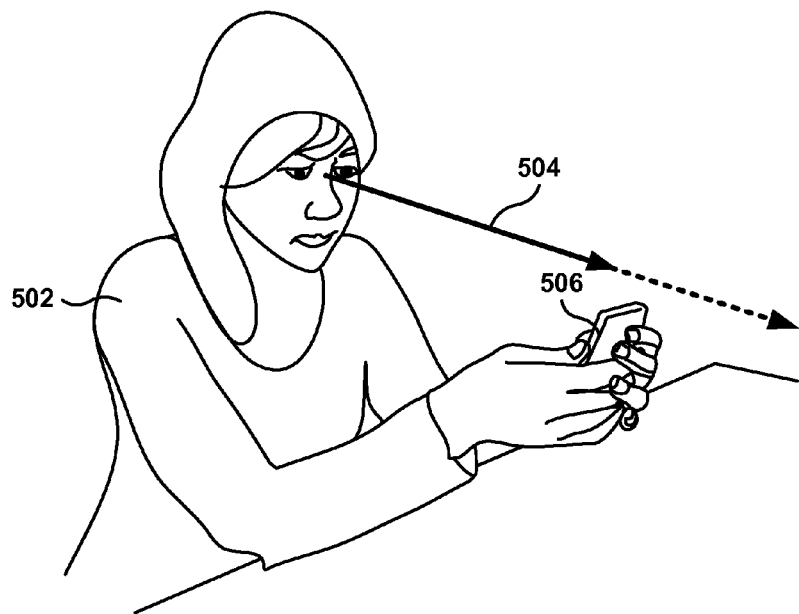
FIG. 5 illustrates a method for fast scrolling in a handheld device using gaze detection, according to one embodiment.

FIG. 5 illustrates a method for fast scrolling in a handheld device using gaze detection, according to one embodiment. Portable device 506 includes a front-facing camera used to perform gaze detection. However, since the display area is small, when compared to the area of a stand-alone display, it would be difficult with gaze detection alone to select small objects in the display. However, embodiments of the invention provide navigation assistance to accelerate the navigation while using portable device 506 by detecting POGs in the screen or outside the screen.

User 502 directs gaze 504 to areas outside the display of portable device 506 to provide commands or hints to the computer program for navigation. For example, if user 502 is reading a long document, with only a portion of the document being displayed at a time, the user directs the gaze above, below, left, or right of the screen while using another input (e.g., button or touchscreen) to indicate that the user wants to accelerate navigation. Thus, if the user slides the finger down across the touchscreen, while keeping the gaze on the screen, then the program will scroll the display up. However, if the user directs gaze 504 above the display, this indicates that the user wants to go to the top of the document, so when the user starts sliding the finger on the display, the program will jump to the top of the document, no matter what part of the document is being shown. Similarly, the user can look below the display to cause a jump to the bottom of the page. This is particularly helpful in some email clients that show attachment icons at the bottom of the email. If the email is long, it takes a lot of finger scrolling to get to the attachment icons. By using gaze, there is a jump to the bottom resulting in savings of effort and time.

In another embodiment, gaze-assisted navigation is provided to a user reading a book or a magazine in a smart phone or a tablet device. When the user wants to turn the page, the user looks beyond the left side or the right side of the screen and then taps on the screen to cause the page to turn. In yet another embodiment, the user just looks to the left or right edge of the display, in conjunction with tapping the screen, to cause the turn of the page, without requiring the user to look outside the screen. Tablet devices have larger displays, and gaze detection can be accurate enough to determine if the user is looking to the left or the right. For example, cornea analysis would indicate if the pupil is aiming left or right.

Figure 6:
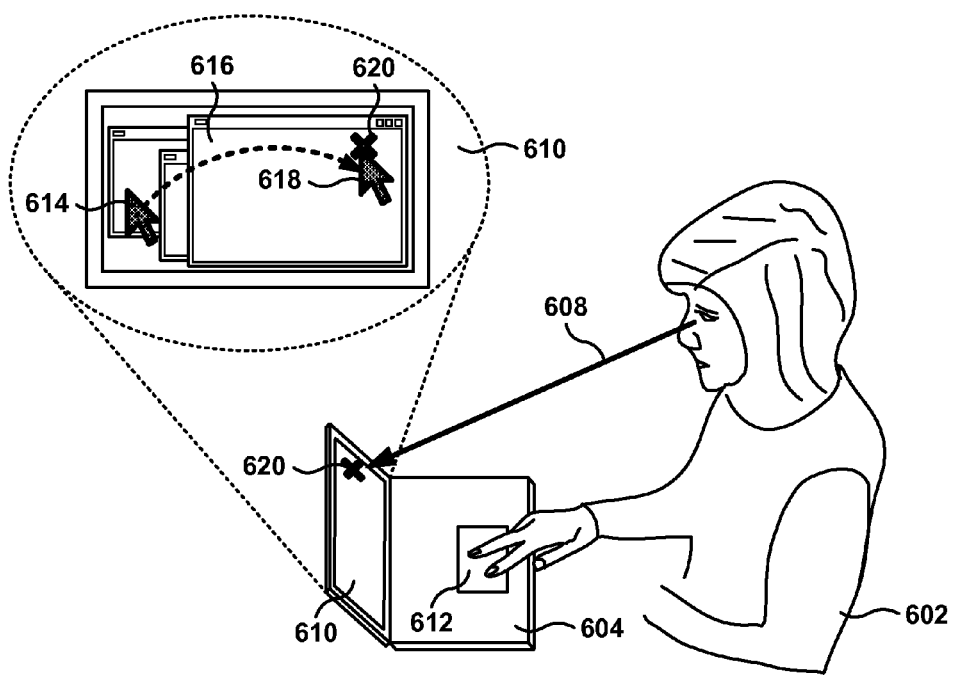
FIG. 6 illustrates a method for fast cursor movement using gaze detection and user input, according to one embodiment.

FIG. 6 illustrates a method for fast cursor movement using gaze detection and user input, according to one embodiment. In one embodiment, a predetermined input, associated with a physical action, causes the computer program to use gaze as a complementary input. For example, user 602 is working with laptop 604, which includes touchpad 612, display 610, and a user-facing camera. A two finger tap on the touchpad triggers the mouse cursor to move based on the gaze of the user.

In the embodiment of FIG. 6, the mouse cursor is in position 614. When the user performs a two-finger tap on touchpad 612, while directing the user's gaze 608 to POG 620, the mouse cursor jumps to position 618, which is proximate to POG 620 or exactly at POG 620. Window 616 is selected because mouse cursor is now inside window 616.

It is noted that the embodiment illustrated in FIG. 6 is exemplary. Other embodiments may utilize different inputs (e.g., a double click on a mouse, two consecutive taps on the touchpad, a key pressed on the keyboard, etc.) to trigger gaze-assisted navigation, or other embodiments may assist navigation in a different way (e.g., select a window, change the active tab of a browser, scroll a window, etc.). The embodiment illustrated in FIG. 6 should therefore not be interpreted to be exclusive or limiting, but rather exemplary or illustrative.

In one embodiment, the GUI provides feedback on the display when the user's gaze is detected. For example, an area approximately centered on the POG is magnified in the display, some windows on the GUI become transparent, icons or windows are re-arranged, or a pop-up menu is displayed, etc.

Figure 7:
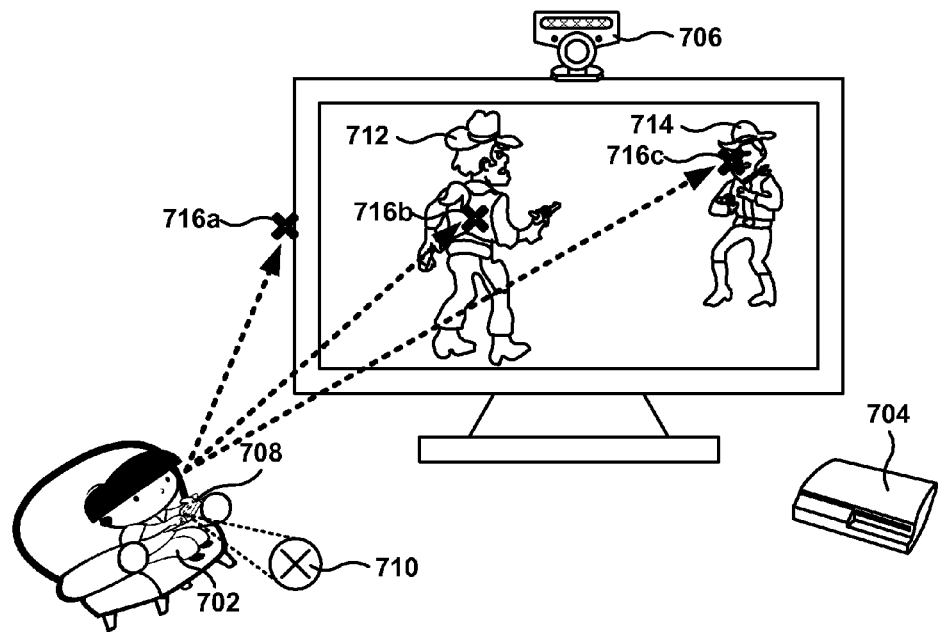
FIG. 7 shows a gaze-assisted game interface, according to one embodiment.

FIG. 7 shows a gaze-assisted game interface, according to one embodiment. User 702 is playing a game executing on game console 704, which is connected to camera 706 used for gaze detection. When user 702 presses a button on controller 708 the game responds with a different action depending on the gaze of the user when the button is pressed. In the embodiment of FIG. 7, the user is controlling game character 712, which is engaged in a battle with enemy character 714. The game reacts differently depending on the user's POG.

When the user's POG 716a is on the edge or the display or outside the display, pressing X button 710 on controller 708 will cause the game to perform a first action (e.g., character 712 reloads the gun). When the user's POG 716b is on the character 712 controlled by user 702, pressing X button 710 will cause the game to perform a second action (e.g., increase health of game character). When the user's POG 716c is on enemy character 714, pressing X button 710 will cause the game to perform a third action (e.g., character 712 shoots at location of POG 716c).

It is noted that the embodiments illustrated in FIG. 7 are exemplary. Other embodiments may utilize different buttons, different types of input devices, or cause different reactions by the game (e.g., pick an object, open a door, cause the character to move, etc.). The embodiments illustrated in FIG. 7 should therefore not be interpreted to be exclusive or limiting, but rather exemplary or illustrative.

Figure 8:
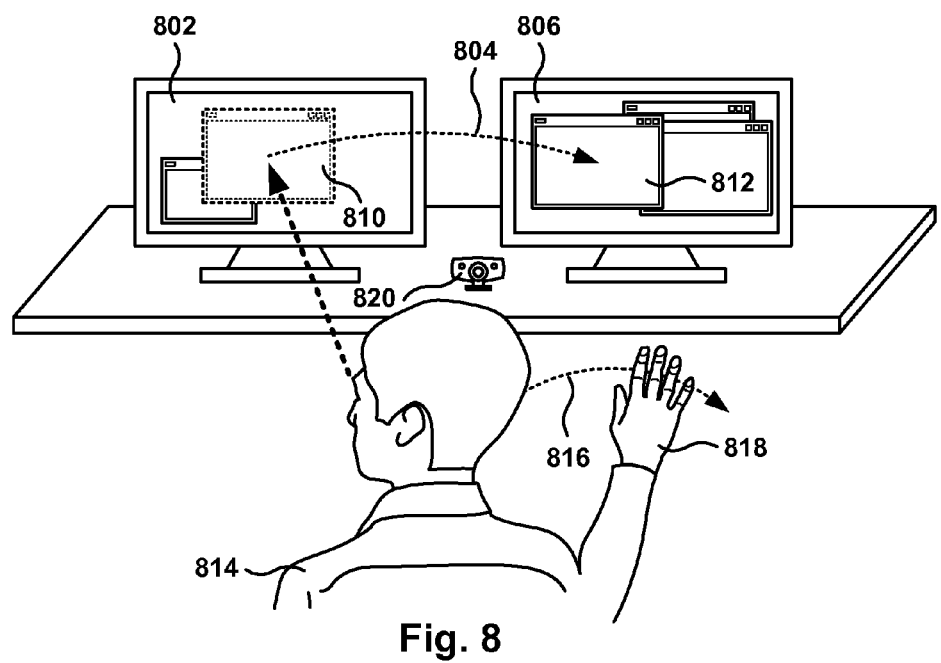
FIG. 8 illustrates a windows graphical user interface responsive to gestures, according to one embodiment.

FIG. 8 illustrates a windows graphical user interface responsive to gestures, according to one embodiment. The GUI uses gaze and gestures as inputs to enhance the user's interaction with the GUI. When the user performs a predetermined gesture, an action is performed on an object associated with, or selected by, the gaze of the user.

For example, user 814 wishes to move window 810 from display 802 to display 806. To perform the move, the user looks at window 810, raises hand 818, and moves 816 hand 818 from left to right, indicating that user 814 wishes to move window 810 from left to right. Since the desktop is displayed on two displays, the move 804 of the window from left to right, will cause window 810 to end in position 812 in display 806. Images from camera 820 are used for gaze detection and for gesture detection, although any method of gaze detection or gesture detection can also be used. In this case, the intention of the user is manifested in the physical act of performing a gesture with the hand.

In another embodiment, the user gestures are used to manipulate objects rendered on the display and selected with gaze. For example, in a gaming environment, a user looks at an object in the game (e.g., a weapon, a treasure, a coin, a ladder, etc.), and when the user moves the hand, the game responds to the hand motion by performing an associated action on the object. For example, a user may select a coin on the ground with gaze, and then the user moves the hand as if to pick up the coin, resulting in an avatar, or game character controlled by the user, picking up the coin.

Figure 9:
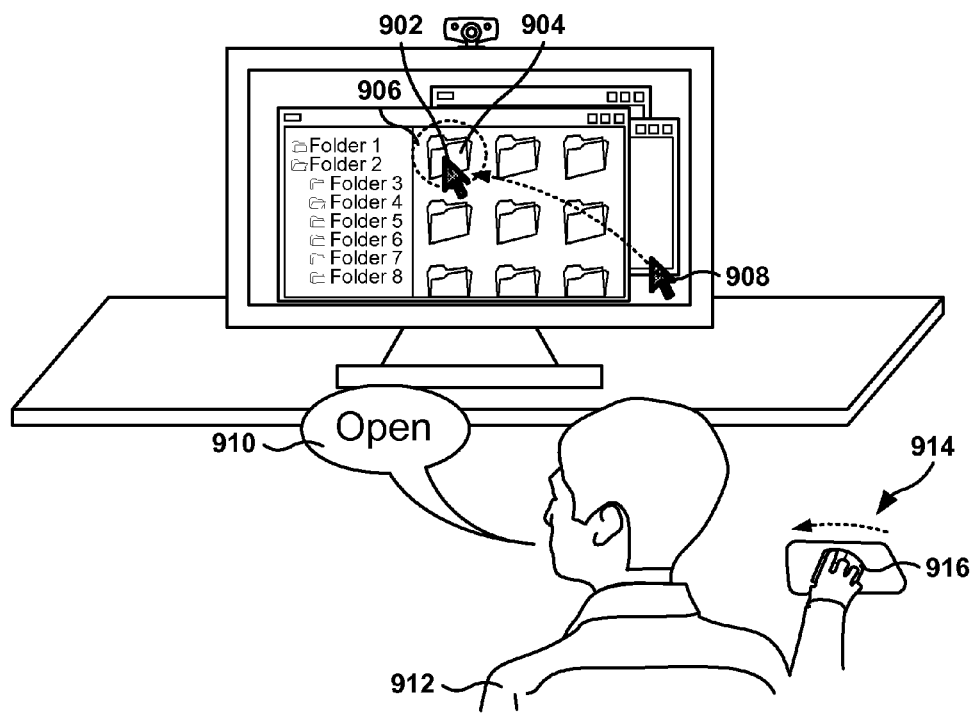
FIG. 9 illustrates an interface that utilizes gaze detection, speech recognition, and one or more computer peripherals, according to one embodiment.

FIG. 9 illustrates an interface that utilizes gaze detection, speech recognition, and one or more computer peripherals, according to one embodiment. In one embodiment, gaze is used to select an area or an object in the display, a user input indicates selection of the object (e.g., moving the mouse or pressing a key), and speech recognition is used to perform an action on the object.

For example, user 912 is working in a windows environment and wants to open folder 904, represented as a folder icon on the desktop. The mouse is located at position 908 in the desktop, away from folder 904. User 912 directs the gaze to folder 904 and starts moving 914 mouse 916. When the mouse motion is detected, the system checks the gaze of the user and determines that the POG is target area 906, situated near folder icon 904. The system then moves, or jumps, the mouse cursor to position 902, which is on folder 904, or near folder 904. If the cursor position is not on the folder, the user performs a small mouse motion to position the cursor on top of folder 904. Once the mouse is on folder 904, the user says 910 a command (e.g., "open," "copy," "delete," "move") which is detected by a speech recognition program. Once the voice command is detected, the requested operation is performed (e.g., opening a window to display the contents of folder 904).

Figure 10:
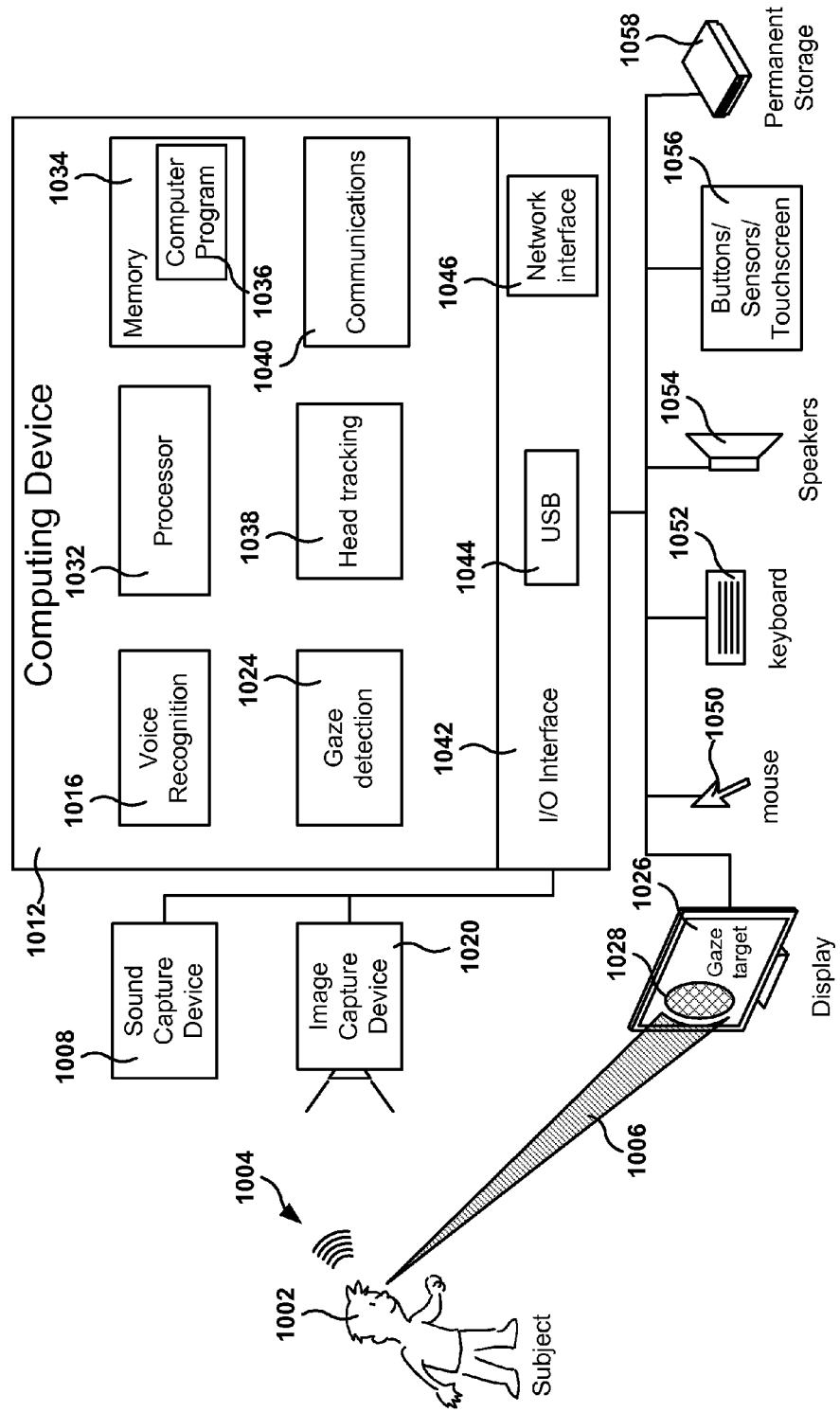
FIG. 10 is a simplified schematic diagram of a computer system for implementing embodiments of the present invention.

FIG. 10 is a simplified schematic diagram of a computer system for implementing embodiments of the present invention. It should be appreciated that the methods described herein may be performed with a digital processing system, such as a conventional, general-purpose computer system. Special purpose computers, which are designed or programmed to perform only one function, may be used in the alternative. Computing device 1012 includes a processor 1032, which is coupled to memory 1034, to permanent storage device 1058, and to other modules inside, or connected to, computing device 1012. Computing device 1012 includes communication module 1040. GUI computer program 1036 resides in memory 1034, but can also reside in permanent storage device 1058.

Computing device 1012 is in communication with sound capture device 1008, image capture device 1020, and display 1026. In one embodiment, sound capture device 1008, image capture device 1020, and display 1026 may be embedded within computing device 1012, or may be combined into one or more devices, such as a video recorder. In one embodiment, the sound capture device includes a microphone, and in another embodiment, the sound capture device includes a microphone array.

Gaze target 1028 is defined within the display, although gaze target 1028 may also be set outside the display, such as for example, on computing device 1012, or an area surrounding display 1028, as previously described. Gaze detection module 1024 determines the POG of the user, and determines if the gaze 1006 of user 1002 is directed towards gaze target 1028. On the voice side, voice recognition module 1016 processes the sound 1004 received from sound capture device 1008, and performs voice recognition to determine if a valid user verbal command has been issued. GUI computer program 1036 receives inputs from gaze detection 1024, voice recognition module 1016, and head tracking module 1038, to implement embodiments of the invention described above.

Permanent storage device 1058 represents a persistent data storage device such as a floppy disc drive or a fixed disc drive, which may be local or remote. Network interface 1046 provides network connectivity, allowing communications with other devices. It should be appreciated that processor 1032 may be embodied in a general-purpose processor, a special purpose processor, or a specially programmed logic device. Input/Output (I/O) interface 1042 provides communication with different peripherals, such as display 1026, keyboard 1052, mouse 1050, sound capture device 1008, image capture device 1020, speakers 1054, buttons, sensors, touchscreen 1056, etc. A Universal Serial Bus (USB) module 1044 provides connectivity to USB devices.

Display 1026 is configured to display the user interfaces described herein. Keyboard 1052, mouse 1050, and other peripherals are coupled to I/O interface 1042 in order to communicate information to processor 1032. It should be appreciated that data to and from external devices may be communicated through I/O interface 1042. The invention can also be practiced in distributed computing environments where tasks are performed by remote processing devices that are linked through a wire-based or wireless network.

It is noted that the embodiment illustrated in FIG. 10 is exemplary. Other embodiments may utilize different modules, or have several functions performed by one module, etc. The embodiment illustrated in FIG. 10 should therefore not be interpreted to be exclusive or limiting, but rather exemplary or illustrative.

Figure 11:
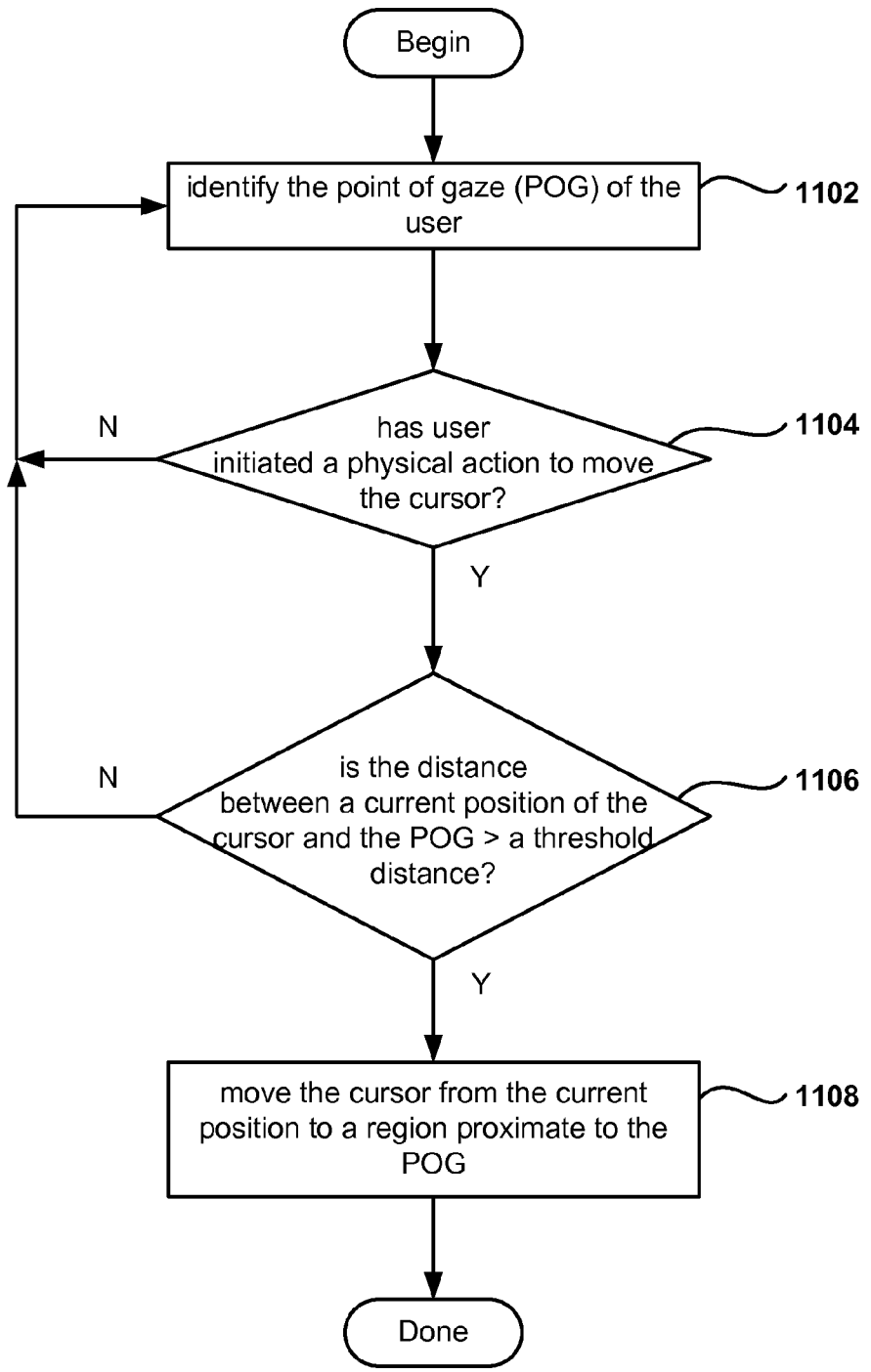
FIG. 11 shows a flowchart illustrating an algorithm for interfacing a user with a computer program executing in a computing device in accordance with one embodiment of the invention.

FIG. 11 shows a flowchart illustrating an algorithm for interfacing a user with a computer program executing in a computing device in accordance with one embodiment of the invention. In operation 1102, the POG of the user is identified, and in operation 1104, a check is made to determine if the user has initiated a physical action to move the cursor. If the user has initiated a physical action, the method proceeds to operation 1106, and goes back to operation 1102 if the user has not initiated the physical action.

In operation 1106, a check is made to determine if the distance between the current position of the cursor and the POG is greater than a threshold distance. If the distance is bigger than the threshold distance, the method proceeds to operation 1108, where the cursor is moved to a region proximate to the POG. If the distance is not bigger than the threshold distance, the method flows back to operation 1102.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for interfacing a user with a computer program executing in a computing device, the method comprising:
    identifying a point of gaze (POG) of the user on a display;
    detecting initiation of a physical action by the user to move a position of a cursor on the display, the cursor defining a focus area associated with the computer program;
    determining if a distance between a current position of the cursor and the POG is greater than a threshold distance; and
    moving the cursor from the current position to a region proximate to the POG when the distance is greater than the threshold distance, wherein moving the cursor further includes:
        changing a cursor displacement speed of a mouse that controls the cursor based on the distance between the current position of the cursor and the POG, wherein the cursor moves slower as the distance between the current position of the cursor and the POG becomes smaller.

2. The method as recited in claim 1, wherein the physical action is one of moving a mouse, pressing a key, pressing a button, touching a screen, touching a touchpad, making a gesture, or speaking.

3. The method as recited in claim 1, wherein determining the distance further includes:
    determining a value of the distance measured in screen pixels between the current position and the POG.

4. The method as recited in claim 1, wherein determining the distance further includes:
    determining if the current position and the POG are situated in different windows in a GUI.

5. The method as recited in claim 1, wherein the cursor is one of a mouse cursor, a text cursor, a field selected cursor, or a page cursor.

6. The method as recited in claim 1, wherein moving the cursor further includes:
    detecting a plurality of entry fields in a web page; and
    placing the cursor on an entry field from the plurality of entry fields that is closest to the POG when the user presses a keyboard key.

7. The method as recited in claim 1, further including:
    tracking a position of a head of the user.

8. The method as recited in claim 1, further including:
    detecting an input from the user that triggers immediate gaze-assisted navigation; and
    moving the cursor to the POG after detecting the input.

9. The method as recited in claim 1, further including:
    magnifying, after moving the cursor, an area centered around the cursor for presentation on the display; and determining a first window on the display where the POG is detected, the window belonging to a graphical user interface (GUI) that supports display of a plurality of windows on the display.

10. The method as recited in claim 9, further including:
providing a transparent appearance on the display to windows of the GUI other than the first window 11. A system with a graphical user interface (GUI), the system comprising:
a processor executing a computer program that provides the GUI, the GUI being rendered in one or more displays;
an input device operable to move a position of a cursor on the one or more displays when a physical action is initiated by a user on the input device; and
a gaze detection module operable to identify a point of gaze (POG) of the user, wherein the computer program determines if a distance between a current position of the cursor and the POG is greater than a threshold distance, and wherein the computer program moves the cursor from the current position to a region proximate to the POG when the distance is greater than the threshold distance, wherein moving the cursor further includes changing a cursor displacement speed of the input device based on the distance between the current position of the cursor and the POG, wherein the cursor moves slower as the distance between the current position of the cursor and the POG becomes smaller, wherein moving the cursor further includes detecting a plurality of entry fields in a web page and moving a page cursor to an entry field that is closest to the POG in response to a user input, wherein the page cursor indicates which entry field is active.

12. The system as recited in claim 11, wherein the gaze detection module uses one of analysis of corneal reflection, or analysis of an user image taken with a camera.

13. The system as recited in claim 12, wherein the gaze detection module analyzes a plurality of user images to determine a location of one of more physical features of the user.

14. The system as recited in claim 11, wherein the GUI provides a hint to the user when the POG is placed on an object in the GUI.

15. The system as recited in claim 11, further including:
a voice recognition module is configured to execute a voice command based on the POG.

16. A method for interfacing a user with a computer program executing in a computing device, the method comprising:
identifying a point of gaze (POG) of the user on a display;
detecting initiation of a physical action by the user to move a position of a cursor on the display, the cursor defining a focus area associated with the computer program;
determining if a distance between a current position of the cursor and the POG is greater than a threshold distance;
moving the cursor from the current position to a region proximate to the POG when the distance is greater than the threshold distance, wherein a cursor displacement speed of a mouse that controls the cursor is changed based on the distance between the current position of the cursor and the POG, and the cursor moves slower as the distance between the current position of the cursor and the POG becomes smaller; and
magnifying, after moving the cursor, an area centered around the cursor for presentation on the display.

17. The method as recited in claim 16, further including:
determining a first window on the display where the POG is detected, the window belonging to a graphical user interface (GUI) that supports display of a plurality of windows on the display.

18. The method as recited in claim 17, further including:
providing a transparent appearance on the display to windows of the GUI other than the first window.

19. The method as recited in claim 17, further including:
making the first window as having a window focus of the GUI, wherein the window focus enables user interaction with a program associated with the window focus while disabling interaction with windows not having the window focus.

20. The method as recited in claim 17, further including:
rearranging, on the display, windows that are open based on the POG.

* * * * *